(12) United States Patent
Fukuzawa et al.

(10) Patent No.: US 10,832,540 B2
(45) Date of Patent: Nov. 10, 2020

(54) IMAGING APPARATUS WITH AN IMPACT-RESISTANT FUNCTION

(71) Applicant: CANON KABUSHIKI KAISHA, Tokyo (JP)

(72) Inventors: Kazuhiro Fukuzawa, Kawasaki (JP); Daisuke Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 16/054,362

(22) Filed: Aug. 3, 2018

(65) Prior Publication Data
US 2019/0051126 A1    Feb. 14, 2019

(30) Foreign Application Priority Data
Aug. 9, 2017  (JP) .................................. 2017-153817

(51) Int. Cl.
*G08B 13/196* (2006.01)
*H04N 5/225* (2006.01)

(52) U.S. Cl.
CPC ... *G08B 13/1963* (2013.01); *G08B 13/19619* (2013.01); *H04N 5/225* (2013.01); *H04N 5/2251* (2013.01)

(58) Field of Classification Search
CPC .......... G08B 13/1963; G08B 13/19619; H04N 5/225; H04N 5/2251
See application file for complete search history.

(56) References Cited

U.S. PATENT DOCUMENTS

| 6,356,308 | B1* | 3/2002 | Hovanky | F16M 11/10 348/143 |
| 2001/0006218 | A1* | 7/2001 | Takada | G08B 13/19619 250/551 |
| 2007/0041724 | A1* | 2/2007 | Araki | F16M 11/10 396/419 |
| 2012/0062789 | A1* | 3/2012 | Sasaki | G03B 17/00 348/373 |
| 2012/0111657 | A1* | 5/2012 | Hamakita | B62D 5/0409 180/444 |

FOREIGN PATENT DOCUMENTS

| CN | 1917583 A | 2/2007 |
| CN | 105607265 A | 5/2016 |
| JP | 2003-174572 A | 6/2003 |

* cited by examiner

*Primary Examiner* — Luong T Nguyen
(74) *Attorney, Agent, or Firm* — Canon U.S.A., Inc. IP Division

(57) ABSTRACT

An imaging apparatus includes a camera unit configured to support a lens unit including an image sensor, and capable of rotating about a tilt rotational shaft via a first bearing, and a pan unit configured to support the camera unit, and capable of rotating about a pan rotational shaft via a second bearing, wherein the first bearing and the second bearing have an elastic member disposed on an outer periphery or on an inner periphery, wherein the camera unit is movable relative to the tilt rotational shaft in a case where an impactive force is applied to the camera unit, and wherein the pan unit is movable relative to the pan rotational shaft in a case where the impactive force is applied to the camera unit.

8 Claims, 17 Drawing Sheets

IMAGING APPARATUS WITH AN IMPACT-RESISTANT FUNCTION

BACKGROUND OF THE INVENTION

Field of the Invention

The present disclosure generally relates to image processing and, more particularly, to an imaging apparatus including a pan-tilt camera with an impact-resistant function.

Description of the Related Art

In a conventional monitoring camera with an impact-resistant property, a dome cover for covering a lens unit is made of an impact-resistant material such as polycarbonate resin, and an outer housing is made of metal. The impact-resistant property is thereby added to the monitoring camera apparatus. Further, there is a camera provided with a dome cover made of resin, to which an impact-absorbing mechanism is added to prevent the dome cover from damaging an internal component such as a lens unit when the dome cover is significantly deformed on impact.

One of this type of camera is a camera that includes a support member for supporting a camera unit, a bracket for supporting the support member, a pressing member for pressing the support member in the direction opposite to the bracket, and a dome cover attached to a main body that supports the bracket. In this monitoring camera apparatus, even if an impactive force is given to the dome cover, which is attached to the main body and the impact force is applied to the camera unit via the dome cover, the support member moves while displacing the pressing member. Therefore, the impactive force is absorbed, which can prevent damage to the camera unit (see Japanese Patent Application Laid-Open No. 2003-174572).

The dome cover covering the lens unit acts as an optical system. Therefore, in a telephoto lens unit or a lens unit adaptable to the high pixel count, in particular, even a small error in surface accuracy of the dome cover leads to a decrease in resolution. Further, in a camera equipped with an infrared illuminator, reflected glare or a ghost image can appear when an emitted infrared ray is reflected off an inner surface of the dome cover. Therefore, it is necessary to add, for example, a light-blocking mechanism to a portion around the lens unit.

Hence, if an impact-resistant property or water-resistant property can be added, it is desirable to provide a configuration in which a lens unit is not covered with the dome cover.

However, if a camera capable of rotating in a pan-tilt direction is not covered with a dome cover, the impact can be directly received by a rotational shaft that rotatably supports the camera, or to a driving component directly coupled to the rotational shaft.

SUMMARY OF THE INVENTION

The present disclosure is directed to providing an imaging apparatus that can inhibit an influence on a camera unit capable of rotating in a pan-tilt direction, even if an impactive force is received.

According to an aspect of the present disclosure, an imaging apparatus includes a camera unit configured to support a lens unit including an image sensor, and capable of rotating about a tilt rotational shaft via a first bearing, and a pan unit configured to support the camera unit, and capable of rotating about a pan rotational shaft via a second bearing. The first bearing and the second bearing have an elastic member disposed on an outer periphery or on an inner periphery. The camera unit is movable relative to the tilt rotational shaft in a case where an impactive force is applied to the camera unit. The pan unit is movable relative to the pan rotational shaft in a case where the impactive force is applied to the camera unit.

Further features of the present disclosure will become apparent from the following description of exemplary embodiments with reference to the attached drawings.

DESCRIPTION OF THE EMBODIMENTS

Figure 1:
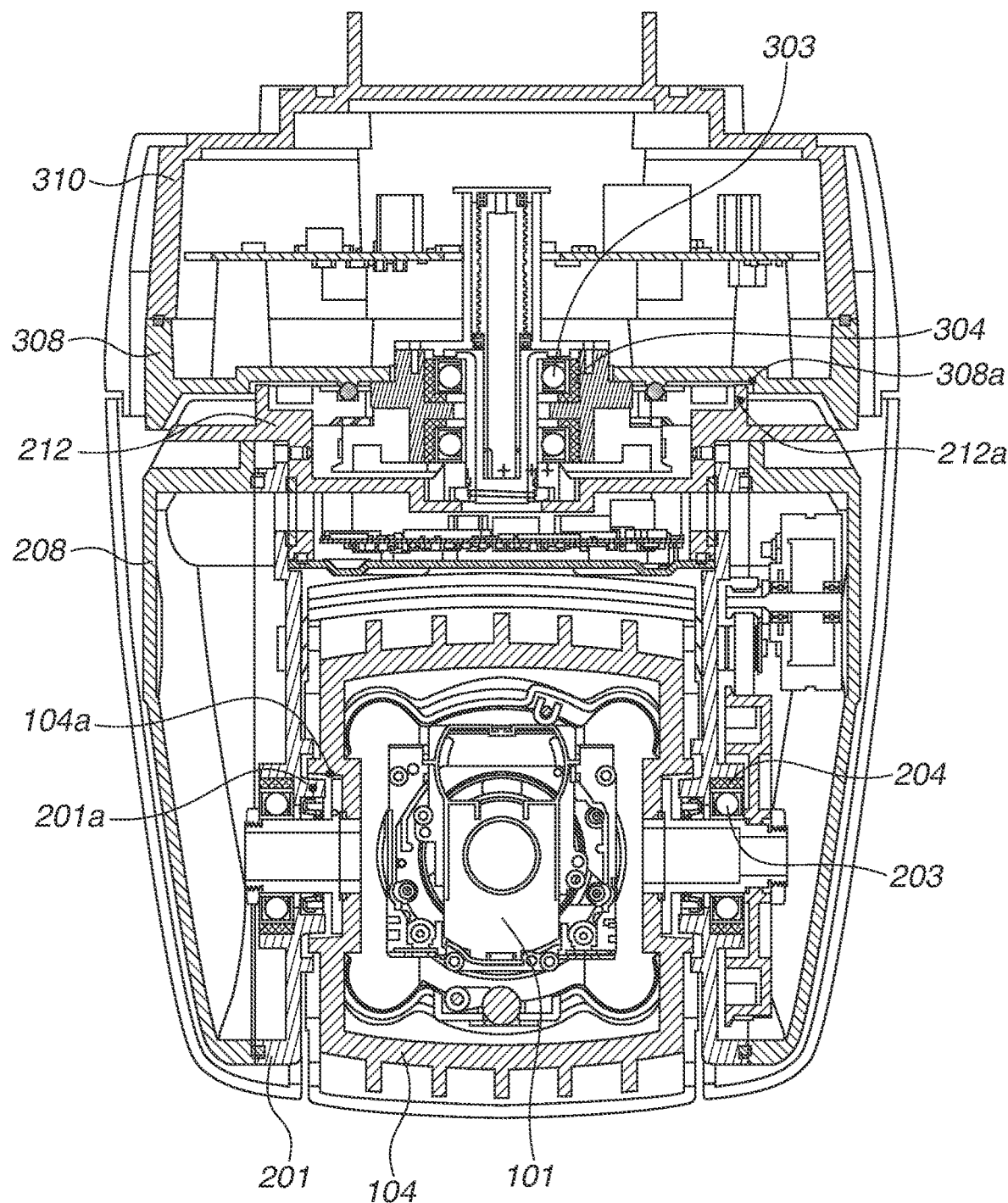
FIG. 1 is a cross-sectional view of a configuration of a pan-tilt camera according to an exemplary embodiment.
Figure 2:
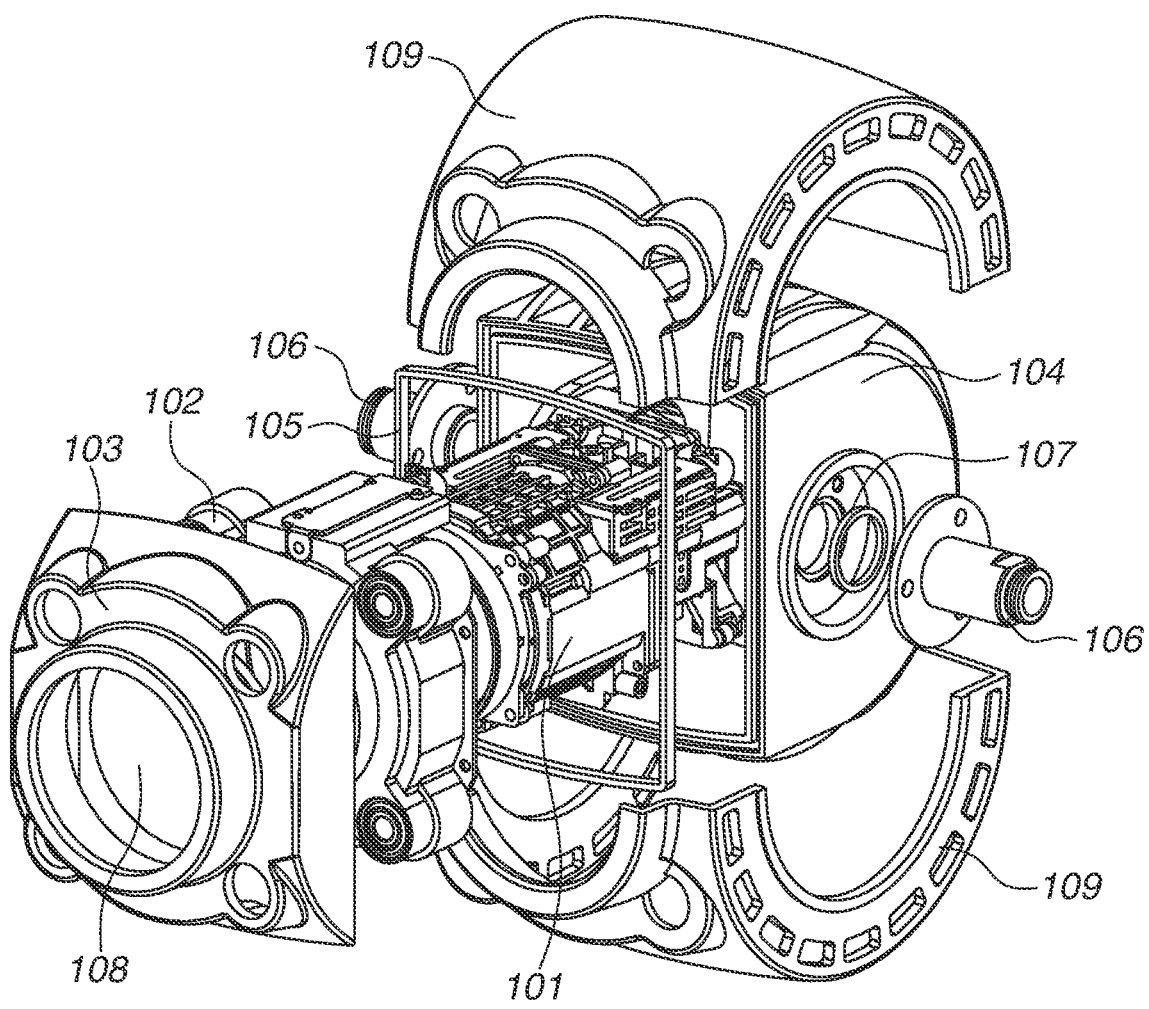
FIG. 2 is an exploded view of a camera unit according to an exemplary embodiment.
Figure 3:
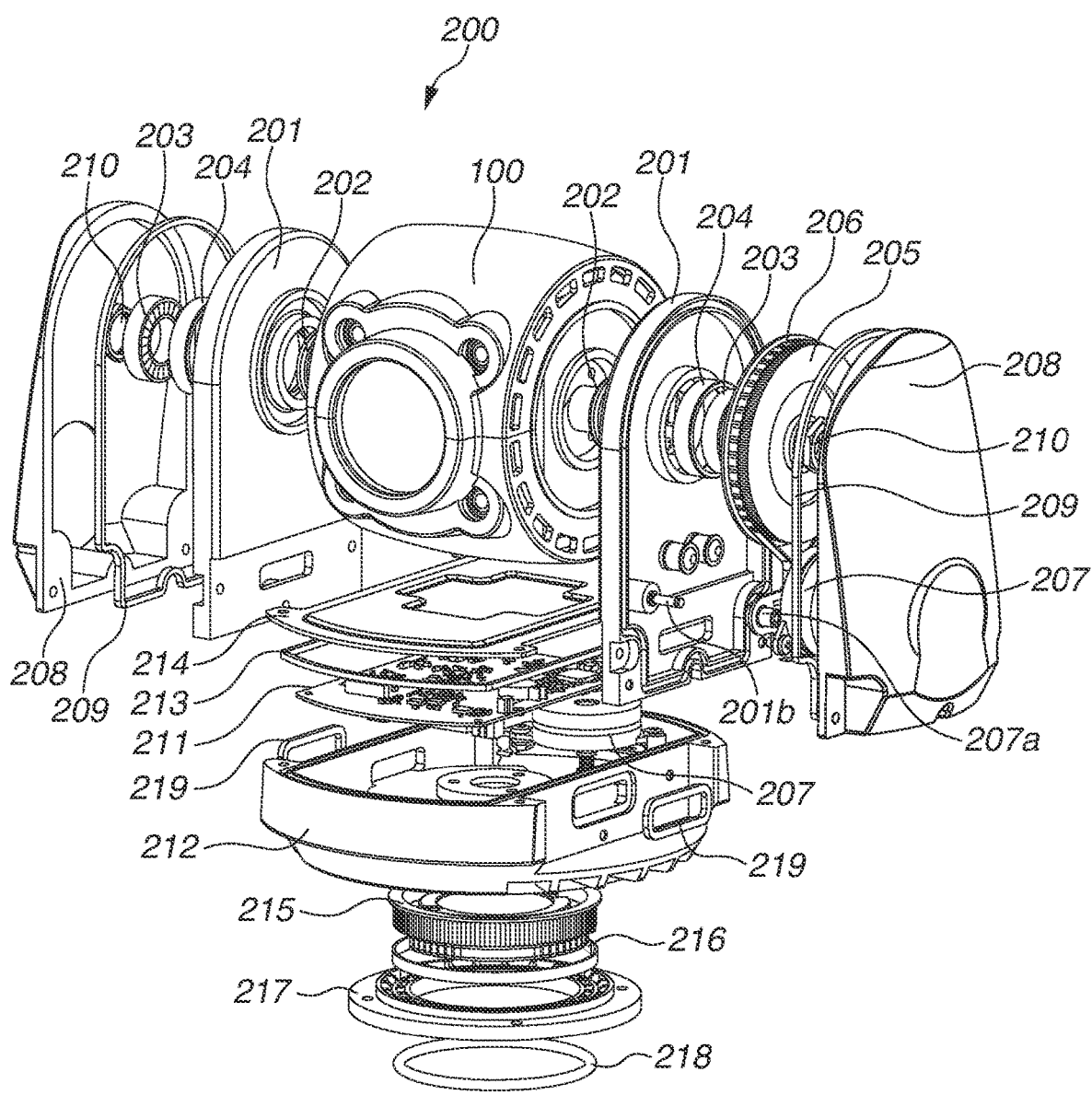
FIG. 3 is an exploded view of a pan unit according to an exemplary embodiment.
Figure 4:
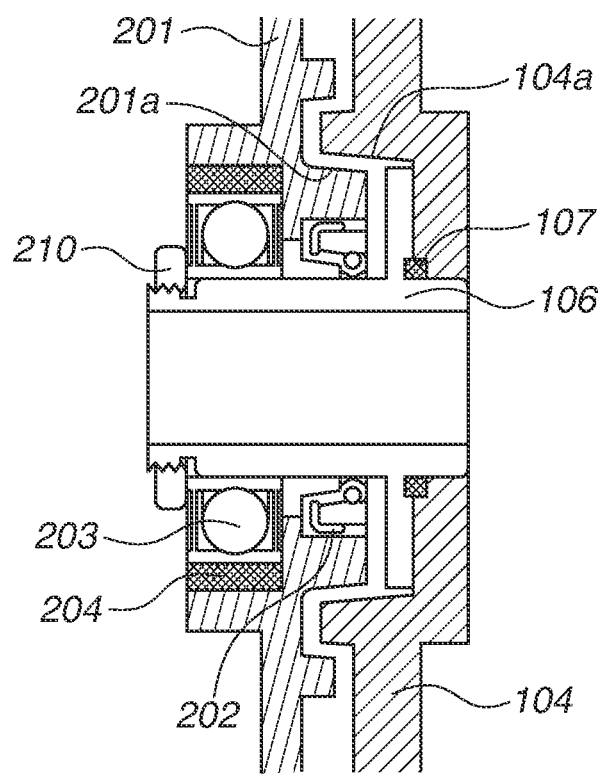
FIG. 4 is a cross-sectional view of a portion around a tilt shaft according to an exemplary embodiment.

A first exemplary embodiment will be described below. FIG. 1 illustrates a cross-sectional view of a configuration of a pan-tilt camera according to the present exemplary embodiment. FIG. 2 illustrates an exploded view of a camera unit according to the present exemplary embodiment. FIG. 3 illustrates an exploded view of a pan unit according to the present exemplary embodiment. FIG. 4 illustrates a cross-sectional view of a portion around a tilt shaft according to the present exemplary embodiment.

An imaging apparatus has the camera unit 100 for supporting a lens unit 101, the pan unit 200 for supporting the camera unit 100, and a fixing unit 300 for supporting the pan unit 200.

First, referring to FIG. 2, the camera unit 100 will be described. The camera unit 100 is capable of rotating about a tilt shaft 106. The camera unit 100 has the lens unit 101, an infrared radiation unit 102, a front cover 103, a camera case 104, and a camera outer cover 109.

The lens unit 101 includes an image sensor, and is attached to and supported by the front cover 103. A front window 108 for covering the front face of the lens unit 101 is attached and fixed to the front cover 103. Further, the infrared radiation unit 102 is attached and fixed to the front cover 103. The front cover 103 is attached to the camera case 104 with a camera case seal 105 interposed therebetween. The tilt shaft 106 serving as a tilt rotational shaft is attached to each of the left and right sides of the camera case 104, with a tilt shaft seal 107 interposed therebetween. Further, the camera outer cover 109 is attached to each of the upper and lower sides of the camera case 104. As illustrated in FIG. 4, the camera case 104 includes a circular depression shape 104a, which is of a circular shape coaxially arranged relative to the tilt shaft 106.

Next, the pan unit 200 will be described. The pan unit 200 includes a ball bearing 203, a tilt support stand 201, a tilt pulley 205, and a motor unit 207.

As illustrated in FIG. 3, in the pan unit 200, the tilt shaft 106 on each of the left and right sides rotatably supports the camera unit 100 about the tilt shaft 106. The camera unit 100 is inserted into the ball bearing 203 serving as a first bearing. The ball bearing 203 has an outer periphery covered with an elastic member 204. The ball bearing 203 is fit in and supported by the tilt support stand 201. A screw is formed at the tip of the tilt shaft 106. The ball bearing 203 is fixed to the tilt support stand 201 by fastening a nut 210 to the screw. The elastic member 204 is made of, for example, rubber. Further, an oil seal 202 is provided between the camera unit 100 and the ball bearing 203.

Further, as illustrated in FIG. 4, the tilt support stand 201 has a circular protrusion shape 201a, which is coaxially arranged relative to the tilt shaft 106. The circular depression shape 104a of the camera case 104 and the circular protrusion shape 201a of the tilt support stand 201 are arranged with a space therebetween. The circular depression shape 104a and the circular protrusion shape 201a are disposed where the camera case 104 and the tilt support stand 201 are closest to each other. The circular depression shape 104a and the circular protrusion shape 201a are arranged with a predetermined space therebetween, so as not to interfere with rotation about the tilt shaft 106 of the camera unit 100.

In the present exemplary embodiment, the outer periphery of the ball bearing 203 is covered with the elastic member 204. However, the elastic member 204 may be fitted to an inner periphery of the ball bearing 203 and then the tilt shaft 106 would be configured to be inserted into the elastic member 204.

Further, the tilt pulley 205 is fitted and fixed to the tilt shaft 106 on one side. The tilt pulley 205 is fitted into a shape such as a keyway or D-cut (not illustrated) of the tilt shaft 106, and fastened with the nut 210, thereby integrally rotating with the tilt shaft 106. The motor unit 207 transmits power by using a timing belt 206, and rotates the tilt pulley 205 to drive and rotate the camera unit 100 in a tilt direction. The motor unit 207 has a bearing portion 207a, and is thereby fitted to and rotatably supported by a motor support shaft 201b. In addition, the motor unit 207 is urged by an urging member (not illustrated) in a direction away from the tilt pulley 205, thereby providing predetermined tension to the timing belt 206. Further, the motor unit 207 transmits power by using a timing belt 216, and drives the pan unit 200 to rotate about a pan pulley 215 in a pan direction. Furthermore, the motor unit 207 has the bearing portion 207a, and is fitted to and rotatably supported by a motor support shaft (not illustrated). In addition, the motor unit 207 is urged by an urging member (not illustrated) in a direction away from the pan pulley 215, thereby providing predetermined tension to the timing belt 216.

A side cover 208 is attached to the tilt support stand 201 across a side cover seal 209. The tilt support stand 201 is attached to a pan rotation stand 212 across a tilt support stand seal 219. On the camera unit 100 side of the pan rotation stand 212, a control substrate 211 is provided, and a pan rotation stand cover 214 is attached across the pan rotation stand seal 213. Further, an O-ring holding member 217 is attached to the fixing unit 300 side of the pan rotation stand 212 to hold an O-ring 218.

Next, a case where an impactive force is applied to the camera unit 100 will be described.

When an impact is applied to the camera unit 100, the camera case 104 is pressed. Accordingly, the elastic member 204 is pressed and deformed via the tilt shaft 106 and the ball bearing 203. Due to this deformation of the elastic member 204, the ball bearing 203 is moved. As a result, the camera unit 100 moves in a tilt-shaft direction and a vertical direction to escape from the impact.

If the movement of the camera unit 100 exceeds a predetermined amount, the circular depression shape 104a and the circular protrusion shape 201a come into contact with each other because the space therebetween disappears, and the impact is received. Hence, an impact of a certain level or more is not applied to the ball bearing 203 and the tilt shaft 106, so that damage can be prevented. Further, the circular depression shape 104a and the circular protrusion shape 201a have the circular shape coaxially arranged relative to the tilt shaft 106. Therefore, the circular depression shape 104a and the circular protrusion shape 201a can receive an impact directed to the camera unit 100 from every direction in a similar manner. Furthermore, it is also possible to provide a configuration stronger against an impact, by forming the camera case 104 and the tilt support stand 201 with the use of metal such as highly rigid aluminum die-casting.

The oil seal 202 contains a circular elastic member. Therefore, the oil seal 202 is fitted to the tilt shaft 106 to press the tilt shaft 106 in a diameter reduction direction, thereby maintaining constant contact with the tilt shaft 106. Even if the camera unit 100 moves in the tilt-shaft direction and the vertical direction, no change occurs in the pressing force in the diameter reduction direction. Therefore, the oil seal 202 can follow while maintaining the contact with the tilt shaft 106. The water resistance can be thereby maintained even when an impact is given to the camera unit 100.

Further, in a case where the impact is applied to the camera unit 100, the tilt pulley 205 integrally moves with the camera unit 100 in the tilt-shaft direction and the vertical direction. At this moment, the distance between the tilt pulley 205 and the motor unit 207 changes relatively. The motor unit 207 can move in both of a stretching direction and a loosening direction of the timing belt 206. Therefore, the motor unit 207 can also follow the movement of the tilt pulley 205 by changing the path of the timing belt 206.

Figure 6:
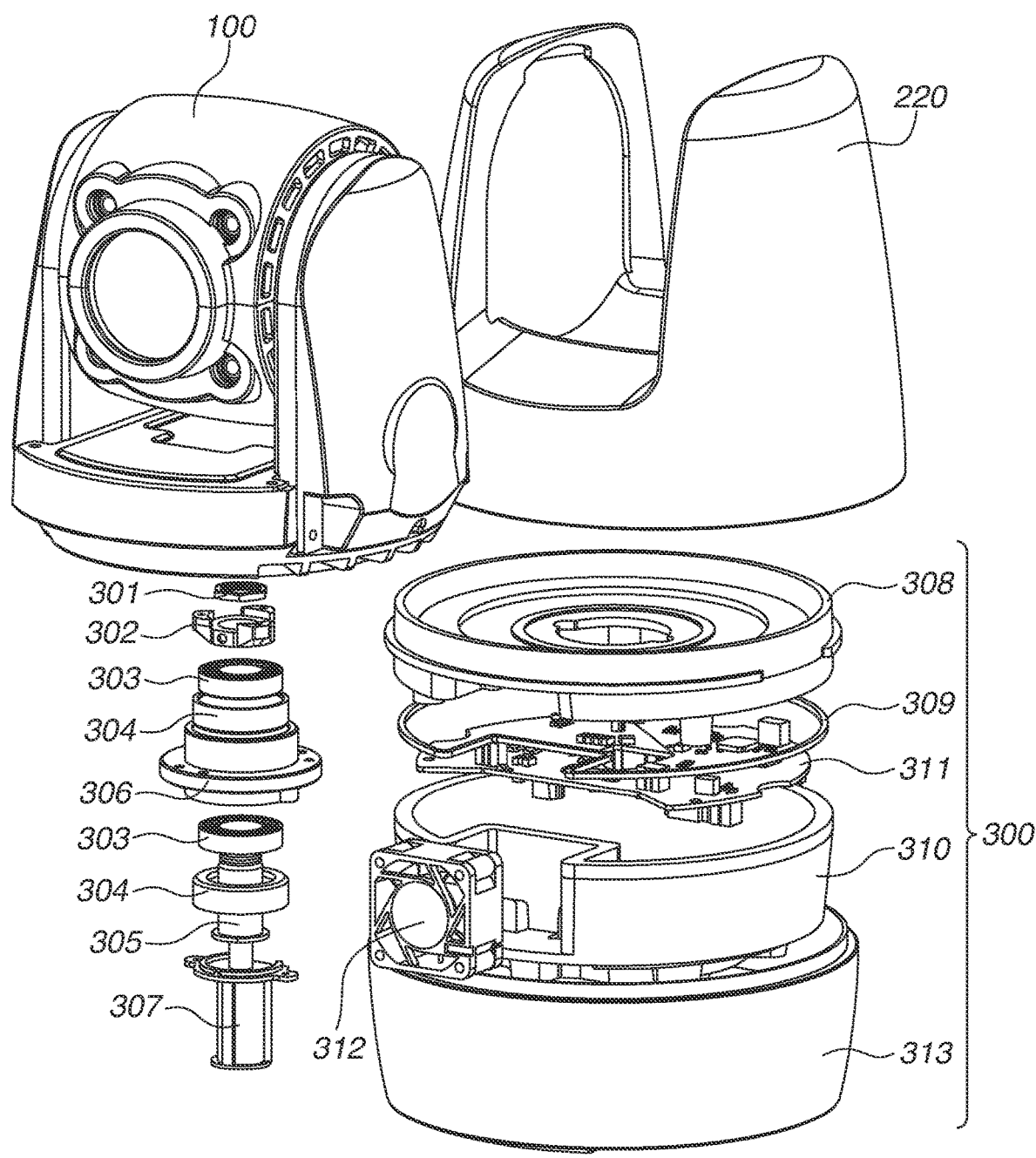
FIG. 6 is an exploded view of a fixing unit according to an exemplary embodiment.

Next, the fixing unit 300 will be described. FIG. 6 illustrates an exploded view of the fixing unit 300 according to the present exemplary embodiment. A pan support component 302 is fixed to the pan rotation stand 212. The pan support component 302 is also fitted and fixed to a pan shaft 305 by a nut 301 to rotate integrally with the pan shaft 305.

The pan shaft 305 serves as a pan rotational shaft. Two ball bearings 303 are coaxially housed in a bearing support component 306. The ball bearings 303 each have an outer periphery covered with an elastic member 304, and serve as a second bearing. Further, the pan pulley 215 and a slip ring 307 are attached to the bearing support component 306. The slip ring 307 is inserted into a hollow portion of the pan shaft 305, and can supply power and transmit a signal to the control substrate 211.

Figure 5:
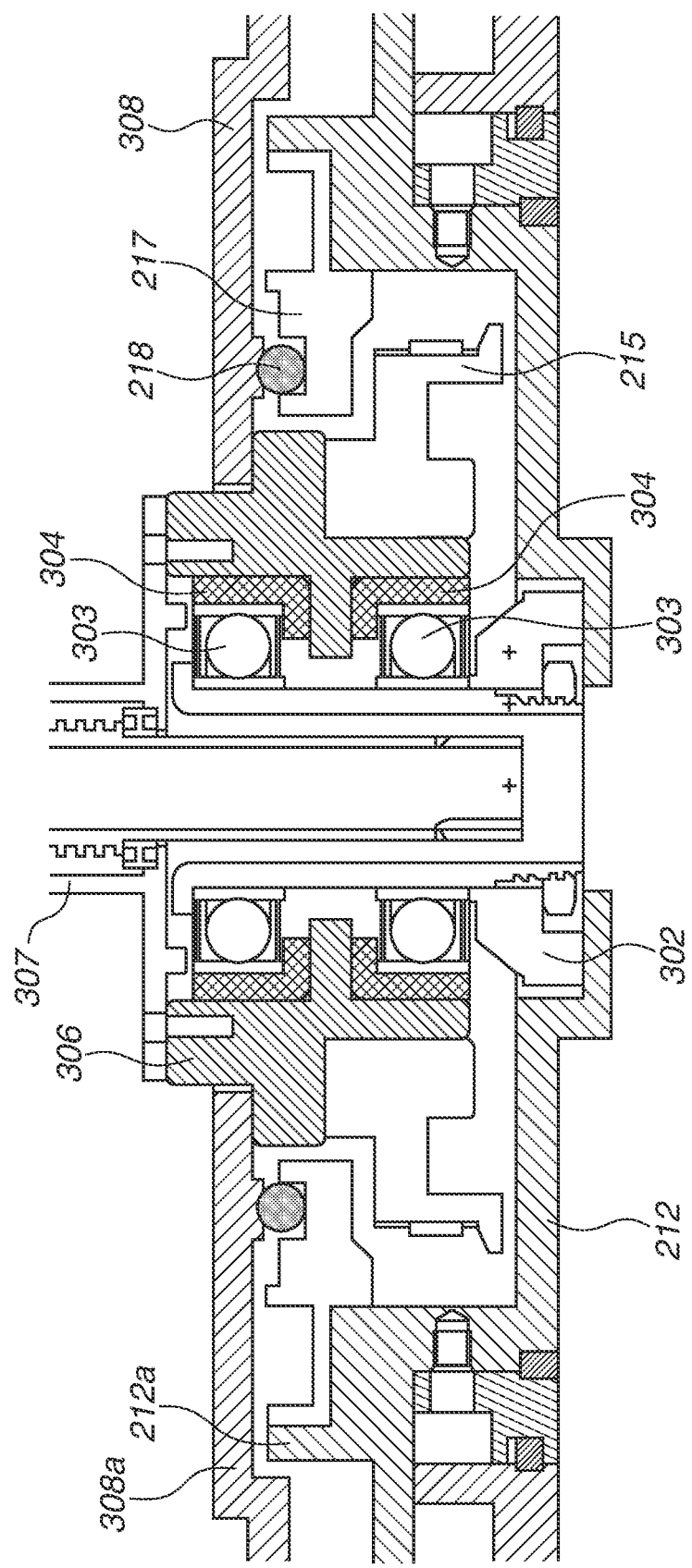
FIG. 5 is a cross-sectional view of a portion around a pan shaft according to an exemplary embodiment.

FIG. 5 illustrates a cross-sectional view of a portion around the pan shaft 305 according to the present exemplary embodiment. The pan rotation stand 212 has a circular protrusion shape 212a, which is coaxially arranged relative to the pan shaft 305. A fixing stand 308 has a circular depression shape 308a, which is coaxially arranged relative to the pan shaft 305. The circular protrusion shape 212a and the circular depression shape 308a are arranged with a space therebetween. The circular protrusion shape 212a and the circular depression shape 308a are disposed where the pan rotation stand 212 and the fixing stand 308 are closest to each other. The circular protrusion shape 212a and the circular depression shape 308a have a predetermined space therebetween, so as not to interfere with rotation about the pan shaft 305 of the pan unit 200.

The bearing support component 306 is attached to the fixing stand 308. The O-ring 218 held by the O-ring holding member 217 is constantly pressed against the fixing stand 308 to resist water.

The fixing stand 308 is attached to a fixing portion case 310 across a fixing stand seal 309. A power supply board 311 for supplying power to the slip ring 307 is housed in the fixing portion case 310. Further, a water-resistant fan 312 for radiating heat is attached to an outer portion of the fixing portion case 310.

A fixing portion outer cover 313 is attached to the fixing portion case 310. Further, a pan outer cover 220 is attached to the pan unit 200 to form the pan-tilt camera according to the present exemplary embodiment.

Next, a case where an impactive force is applied to the pan unit 200 will be described.

When an impact is applied to the pan unit 200, the pan rotation stand 212 is pressed. Accordingly, the elastic member 304 is pressed and deformed via the pan shaft 305 and the ball bearing 303. Due to this deformation of the elastic member 304, the ball bearing 303 is moved. As a result, the pan unit 200 moves in a pan axis direction and the vertical direction to escape from the impact. Further, when an impact is applied to the pan unit 200, the O-ring 218 is deformed similarly to the elastic member 304. Therefore, the pan unit 200 can move in the pan axis direction and the vertical direction.

When the movement of the pan unit 200 exceeds a predetermined amount, the circular protrusion shape 212a and the circular depression shape 308a come into contact with each other because the space therebetween disappears. Accordingly, the impact can be received. Hence, an impact of a certain level or more is not applied to the ball bearing 303 and the pan shaft 305, and damage can be prevented. Further, the circular protrusion shape 212a and the circular depression shape 308a have the circular shape coaxially arranged relative to the pan shaft 305. Therefore, the circular protrusion shape 212a and the circular depression shape 308a can receive an impact from every direction to the pan unit 200 in a similar manner. Furthermore, it is also possible to provide a configuration stronger against an impact, by forming the pan rotation stand 212 and the fixing stand 308 with use of metal such as highly rigid aluminum die-casting.

When an impact is applied to the pan unit 200, the pan unit 200 moves in the pan axis direction and the vertical direction relative to the pan pulley 215. At this moment, the distance between the pan pulley 215 and the motor unit 207 changes relatively. The motor unit 207 can move in both of a stretching direction and a loosening direction of the timing belt 216. Therefore, the motor unit 207 can also follow the movement of the pan unit 200 by changing the path of the timing belt 216.

In the following description, an optical axis direction of the camera unit 100 is taken as a front-back direction. In particular, a direction toward the front window 108 relative to the tilt shaft 106 is taken as the front direction. Further, a direction perpendicular to the optical axis and perpendicular to the tilt shaft 106 is taken as an up-and-down direction, and a direction toward the camera unit 100 relative to the fixing unit 300 is taken as an upward direction.

Figure 7:
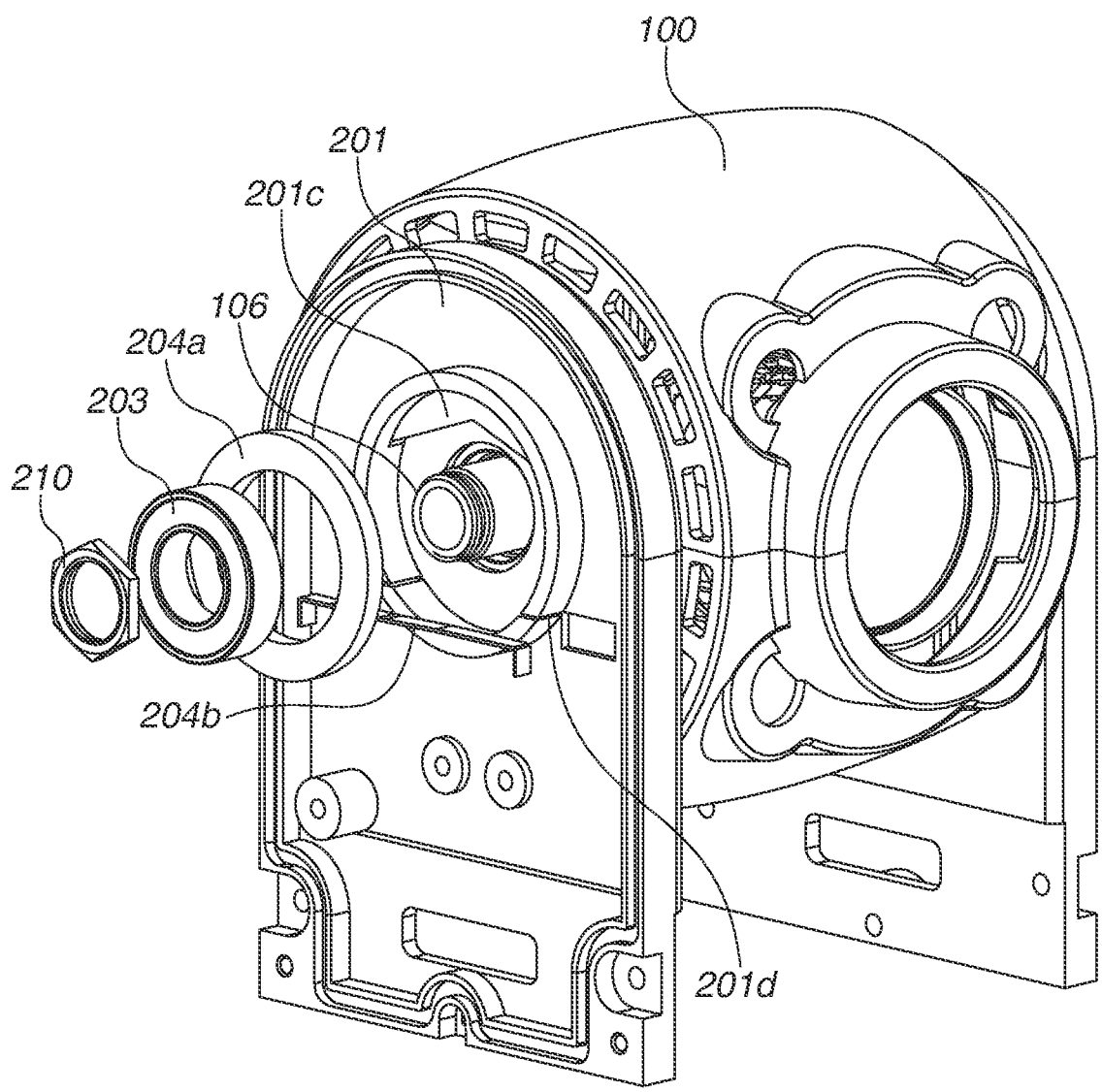
FIG. 7 is an exploded perspective view of a portion around a tilt shaft according to an exemplary embodiment.
Figure 8:
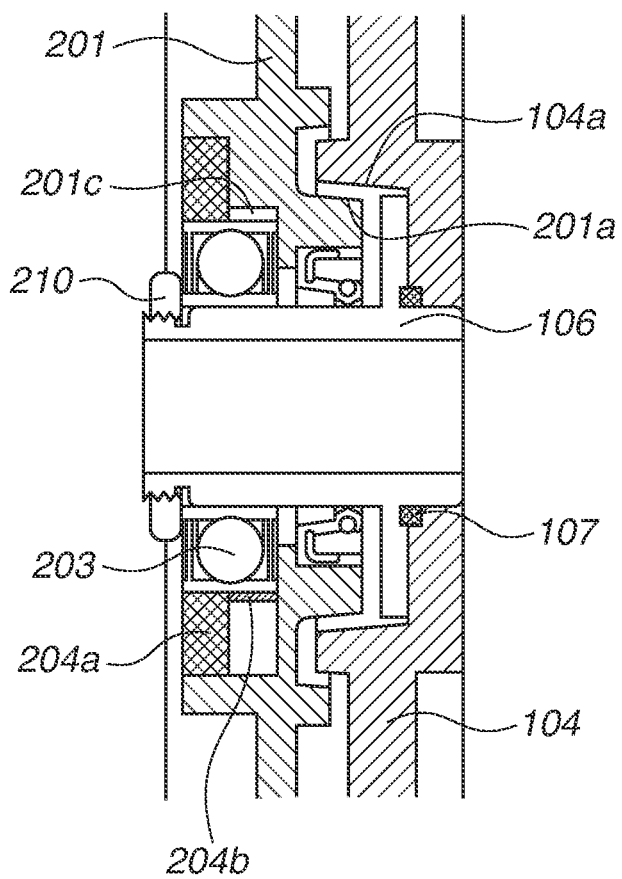
FIG. 8 is a cross-sectional view of a portion around a tilt shaft according to an exemplary embodiment.
Figure 9:
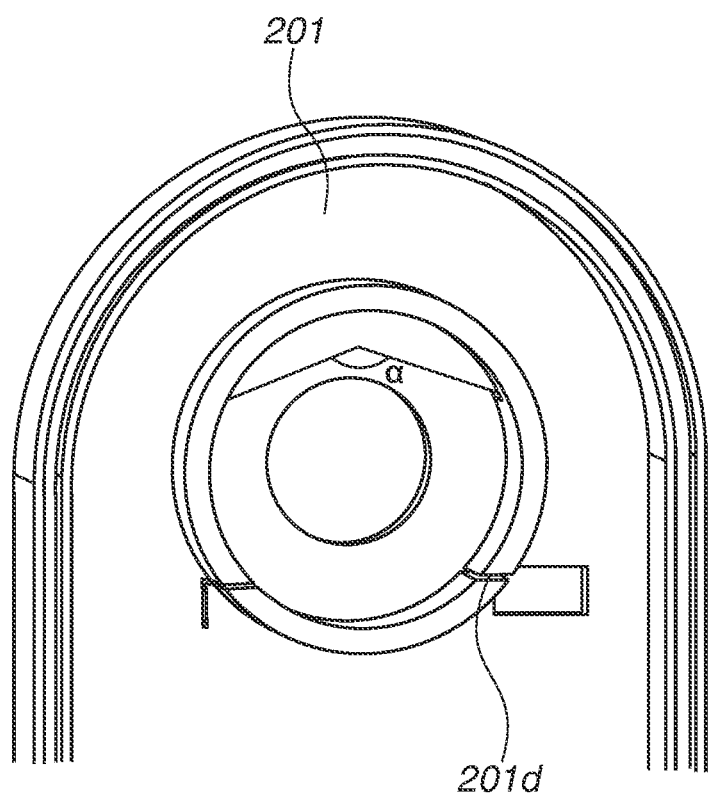
FIG. 9 is an enlarged view of a tilt support stand according to an exemplary embodiment.
Figure 10:
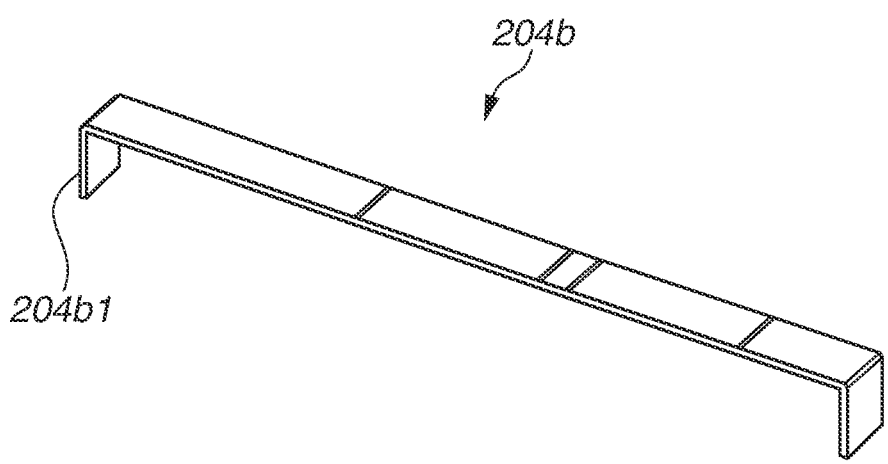
FIG. 10 is an enlarged view of a flat spring according to an exemplary embodiment.
Figure 11:
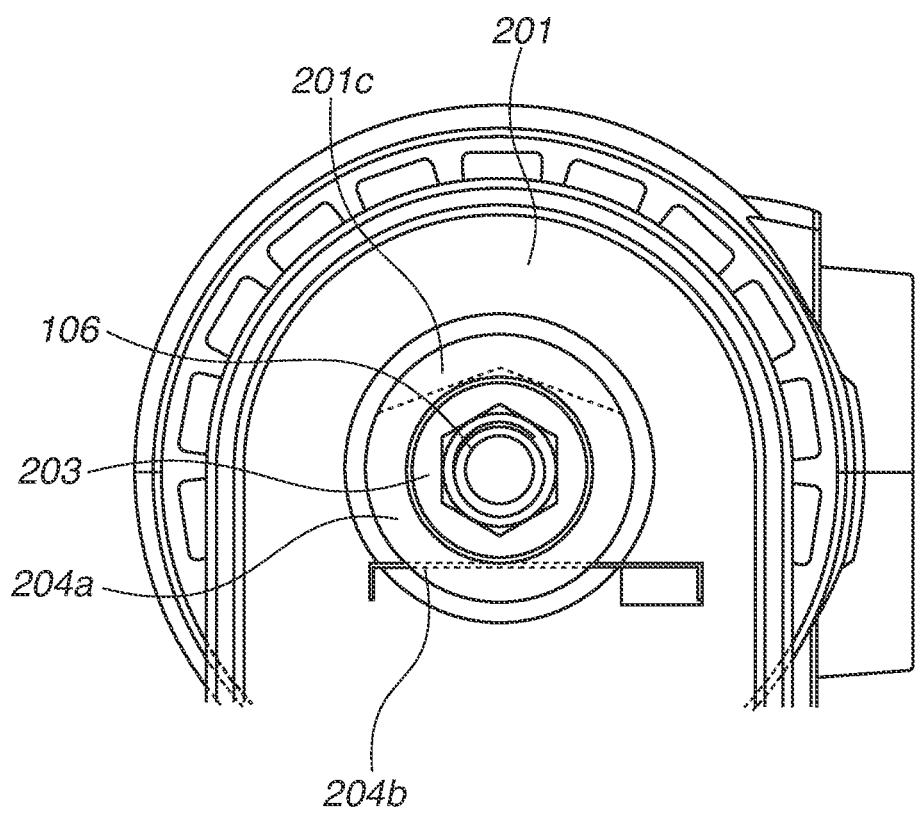
FIG. 11 is a detailed view of a structure around a tilt shaft at normal time according to an exemplary embodiment.

A second exemplary embodiment will be described below. A camera unit 100 and a fixing unit 300 have structures similar to those of the first exemplary embodiment and therefore will not be described. FIG. 7 illustrates an exploded perspective view around a tilt shaft 106 according to the second exemplary embodiment. FIG. 8 illustrates a cross-sectional view of a portion around the tilt shaft 106. FIG. 9 illustrates details of a tilt support stand 201, and FIG. 10 illustrates details of a flat spring 204b.

The tilt shaft 106 on each of the left and right sides is inserted into a ball bearing 203, and the camera unit 100 is supported to be rotatable about the tilt shaft 106. The ball bearing 203 receives an upward urging force from the flat spring 204b inserted and supported in a groove 201d on the tilt support stand 201. The ball bearing 203 is thereby urged against an abutting surface 201c provided on the tilt support stand 201. The flat spring 204b serves as a second elastic member. The flat spring 204b has one end engaged with and supported by the groove 201d, and the other end inserted into the groove 201d to be slidable when the flat spring 204b deforms. The flat spring 204b is disposed on the fixing unit 300 side (the fixing unit side) relative to the tilt shaft 106. Further, the flat spring 204b is disposed closer to the camera unit 100 than a circular rubber ring 204a in a tilt rotational shaft direction.

Further, the ball bearing 203 has an outer periphery partially covered with the circular rubber ring 204a serving as a first elastic member. The ball bearing 203 is engaged with and supported by the tilt support stand 201. The abutting surface 201c on which the ball bearing 203 abuts is configured of two planes parallel to the tilt shaft 106. A screw is formed at the tip of the tilt shaft 106. The ball bearing 203 is supported by the tilt support stand 201 serving as a support unit, by fastening a nut 210 to the screw. The tilt support stand 201 has a holding portion for holding the ball bearing 203. Further, the tilt shaft 106, the ball bearing 203, and the holding portion for holding the ball bearing 203 are arranged in this order toward the outer side in the diameter direction of the tilt shaft 106.

Next, a form for supporting the tilt shaft 106 at the time of normal use and a mechanism for buffering an impact in this configuration when the impact is applied, will be described with reference to FIGS. 11 to 14.

In a case where no impact is applied to the camera unit 100, the ball bearing 203 is urged by the flat spring 204b against the abutting surface 201c provided on the tilt support stand 201. A spring pressure necessary therefor is, desirably, not less than a load determined by combining a force for supporting at least the weight of the camera unit 100 and the tilt shaft 106, and a detaching force from the abutting surface 201c due to a moment generated during tilt operation. Because the abutting surface 201c is configured of the two planes parallel to the tilt shaft 106, the ball bearing 203 is urged to come into contact with the two planes. The position of the ball bearing 203 is thereby determined in a direction perpendicular to the tilt shaft 106. This position is taken as a home position.

[Mechanism for Alleviating Impact from Above]

Figure 12:
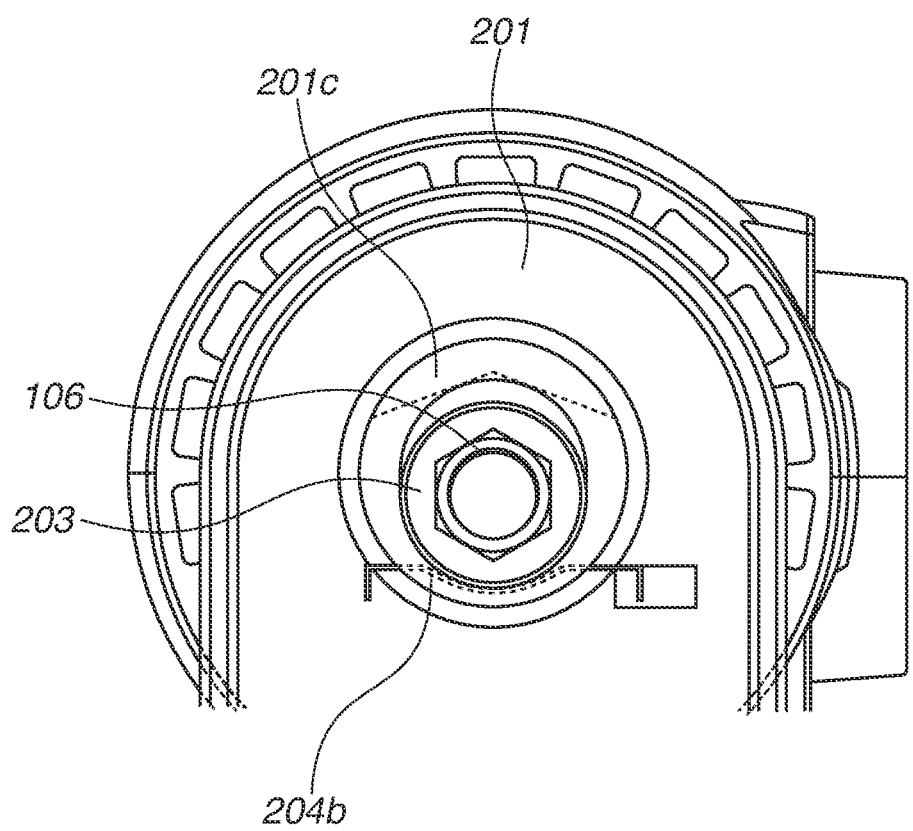
FIG. 12 is a detailed view of a structure around a tilt shaft when an impact is given from above according to an exemplary embodiment.

Next, a case where an impact from above is applied to the camera unit 100 will be described with reference to FIG. 12. When the impact is applied from above to the camera unit 100, the camera unit 100 is pressed. As a result, the tilt shaft 106 and the ball bearing 203 are moved downward. With the movement of the ball bearing 203, the circular rubber ring 204a is compressed and deformed. The impact is thereby alleviated. At this moment, the flat spring 204b inserted and supported in the groove 201d of the tilt support stand 201 also deforms. However, the flat spring 204b is not detached from the groove 201d of the tilt support stand 201 because the flat spring 204b has a retainer 204b1.

After the impact is sufficiently alleviated by the circular rubber ring 204a, an upward urging force from the flat spring 204b acts on the ball bearing 203. Because the ball bearing 203 is urged to take a form, which contacts the two, planes of the abutting surface 201c, the ball bearing 203 returns to the home position. In general, rubber is known to alleviate an impact owing to its compression and deformation. It is desirable to optimize hardness and/or a shape according to an assumed impact, but this will not be described in detail.

As described above, using the circular rubber ring 204a and the flat spring 204b that are elastic members of different characteristics, compatibility between the positioning of the tilt shaft 106 and the alleviation of an impact on a tilt unit can be achieved. However, for example, in a configuration using only the flat spring 204b, a sufficient buffering effect cannot be obtained. This will be described below.

In a case where the circular rubber ring 204a is absent, the impact cannot be sufficiently alleviated when a load is imposed combining a force for supporting the weight of the camera unit 100 and the tilt shaft 106 by the spring pressure of the flat spring 204b, and a detaching force from the abutting surface 201c due to a moment generated during tilt operation. Therefore, the ball bearing 203 is in danger of colliding with the tilt support stand 201. On the other hand, if the spring pressure of the flat spring 204b is increased to address this situation, the flat spring 204b deforms due to the impact and thereby temporarily accumulates large energy. Afterward, the energy accumulated in the flat spring 204b rapidly urges the ball bearing 203 upward, without attenuation. This causes the ball bearing 203 to collide with the abutting surface 201c without being buffered.

[Mechanism for Alleviating Impact from Front/Back Direction]

Figure 13:
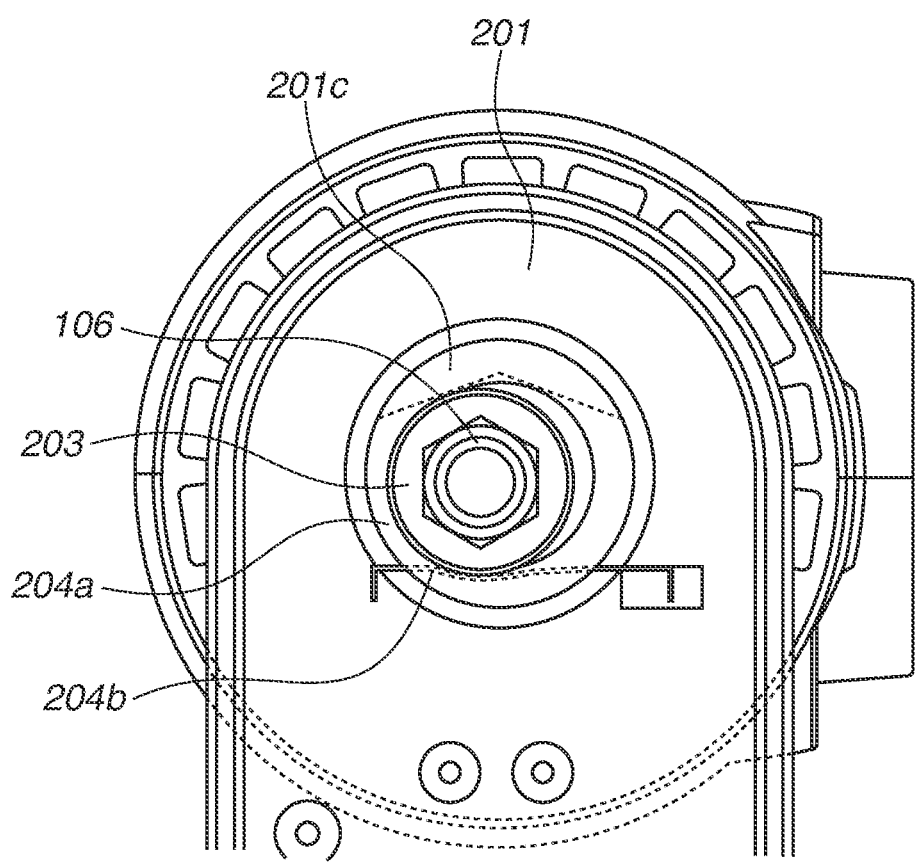
FIG. 13 is a detailed view of a structure around a tilt shaft when an impact is given from front/back according to an exemplary embodiment.

A case where the impact is applied to the camera unit 100 from the front/back direction will be described with reference to FIG. 13. When the impact is applied to the camera unit 100 from the front/back direction, the camera unit 100 is pressed, and the tilt shaft 106 and the ball bearing 203 move in the front-back direction. At this moment, the ball bearing 203 moves also downward receiving a reaction force from the plane of the abutting surface 201c. As a result, the ball bearing 203 slides on the abutting surface 201c. The circular rubber ring 204a is compressed and deformed by the movement of the ball bearing 203, and the impact is thereby alleviated.

After the impact is sufficiently alleviated by the circular rubber ring 204a, an upward urging force from the flat spring 204b acts on the ball bearing 203, and one of the planes of the abutting surface 201c is urged. The ball bearing 203 also receives a reaction force from one of the planes of the abutting surface 201c and thus slides on one of the planes of the abutting surface 201c. As a result, the ball bearing 203 is urged in such a manner that it contacts the two planes of the abutting surface 201c and thus returns to the home position.

[Impact from Below]

Figure 14:
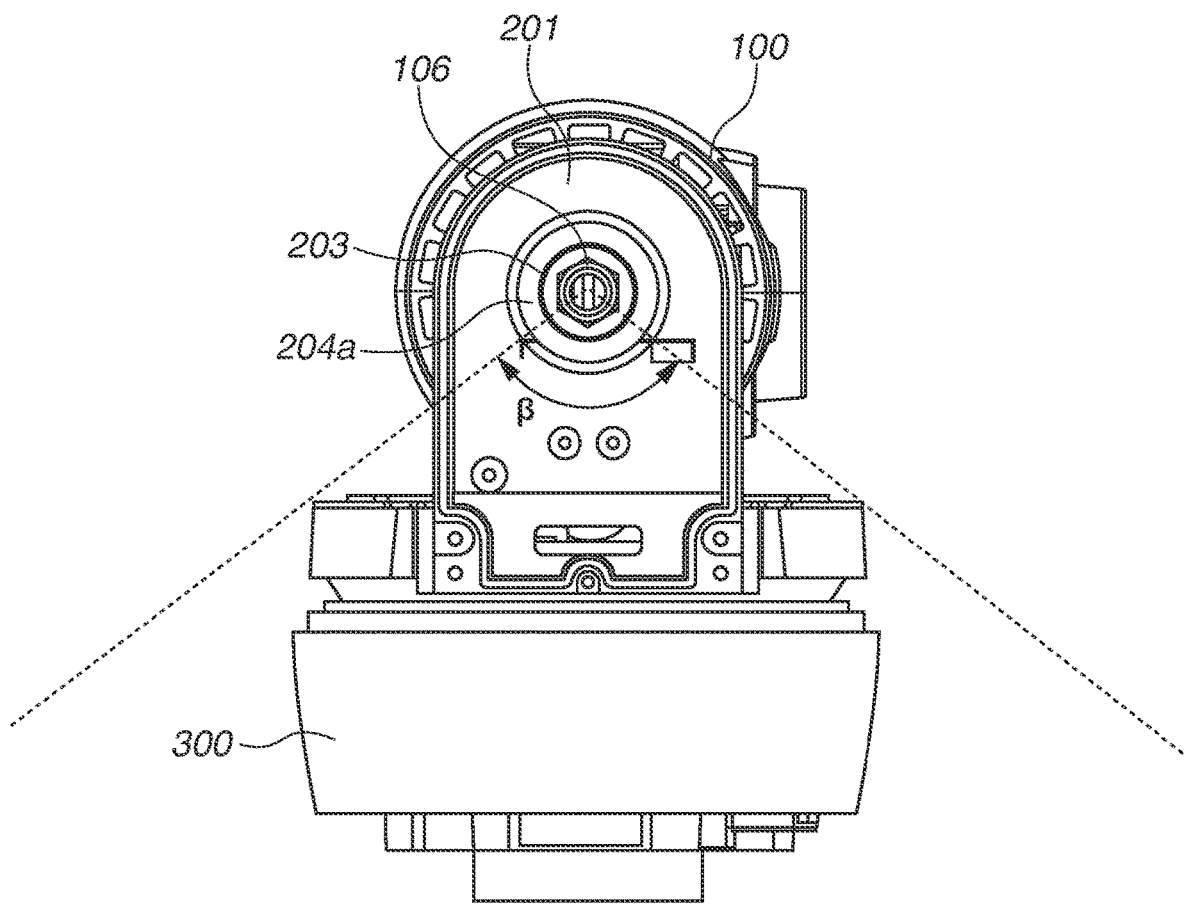
FIG. 14 is a detailed view of a structure around a tilt shaft when an impact is given from below according to an exemplary embodiment.
Figure 15:
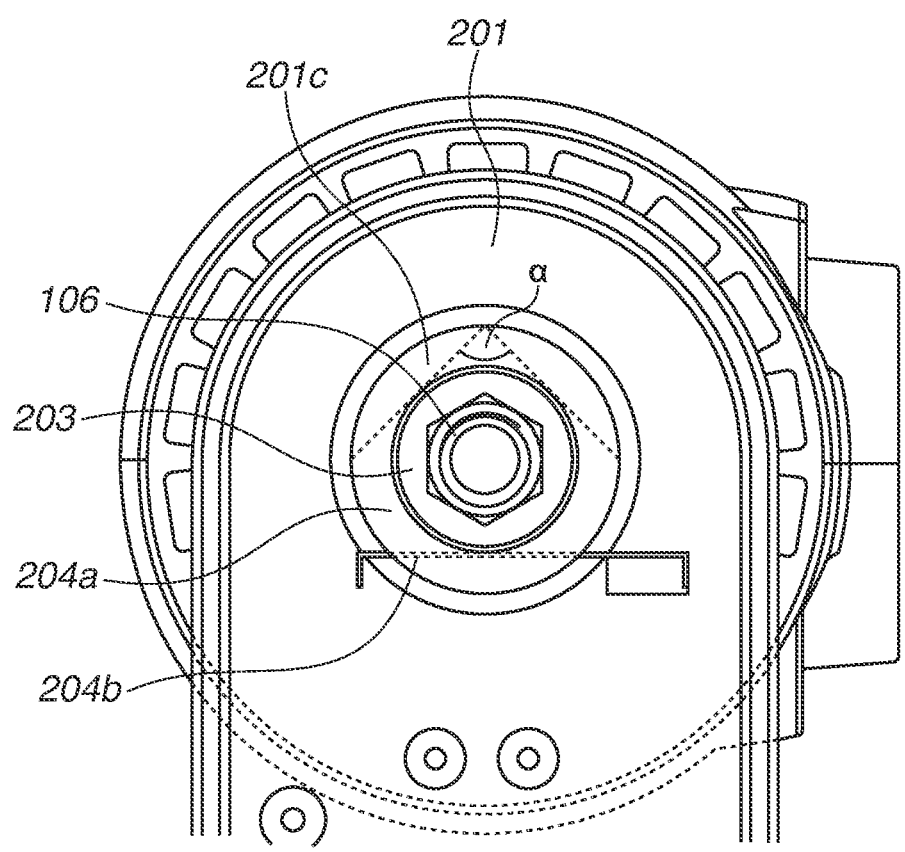
FIG. 15 is a detailed view of an example of a tilt support stand according to an exemplary embodiment.

An impact from below to the camera unit 100 will be described with reference to FIG. 14. Typically, the pan-tilt camera is installed on a ceiling or floor via the fixing unit 300 serving as the fixing unit. More specifically, because the ceiling or floor is present below the fixing unit 300, application of the impact from below is less likely to occur. Further, in a case where the impact is applied from below, because the fixing unit 300 is present below the camera unit 100, the fixing unit 300 receives the impact from within a range indicated with an angle $\beta$. Therefore, the impact is not applied to the camera unit 100. In a case where the impact is applied to the camera unit 100 from outside the range indicated with the angle $\beta$, the impact is alleviated by the above-described mechanism for alleviating the impact from above or the impact from the front/back direction. An angle formed by the two planes of the abutting surface 201c has an influence on a spring pressure necessary for positioning and on a buffering effect from the impact from the front/back direction. This will be described with reference to FIG. 15.

When the impact from the front/back direction is applied to the camera unit 100, the camera unit 100 is pressed. Accordingly, the tilt shaft 106 and the ball bearing 203 move in the front-back direction. The ball bearing 203 moves also in a perpendicular direction receiving a reaction force from the plane of the abutting surface 201c and thus slides on the abutting surface 201c. At this moment, the ball bearing 203 slides while compressing and deforming the circular rubber ring 204a, so that the impact can be alleviated. Here, apparently, the larger an angle $\alpha$ formed by the two planes of the abutting surface 201c is, the more easily the ball bearing 203 slides on the abutting surface 201c and thus, the impact can be alleviated much more.

After the impact from the front/back direction is applied to the camera unit 100 and the ball bearing 203 is thereby moved, positioning is performed by the urging force of the flat spring 204b and the reaction force from the plane of the abutting surface 201c. At this moment, apparently, the smaller the angle $\alpha$ formed by the two planes of the abutting surface 201c, the smaller the pressure allowing the positioning.

As described above, in order to achieve the compatibility between the positioning of the ball bearing 203 and the buffering effect for the camera unit 100, the angle formed by the two planes of the abutting surface 201c is, desirably, 90 degrees or more and less than 180 degrees. In the above-described exemplary embodiment, one of the elastic member 204 is the circular rubber ring 204a. However, other structural members, for example, a plurality of rubbers for receiving the outer periphery of the ball bearing 203 and alleviating the impact may be adopted. Further, while the flat spring 204b is used as one of the elastic members 204, other structural members, such as a torsion coil spring for urging the ball bearing 203 against the abutting surface 201c may be adopted. As a method for fixing the flat spring 204, insertion into and support in the groove 201d of the tilt support stand 201 is used. However, other structures such as screwing one end of the flat spring 204b may be adopted, if the structure urges the ball bearing 203 against the abutting surface 201c without detaching from the tilt support stand 201. The abutting surface 201c is configured of the two planes substantially parallel to the tilt shaft 106. However, other structure may be adopted, if the structure can determine a position in a direction perpendicular to the tilt shaft 106, by using the urging force of the elastic member 204.

Figure 16:
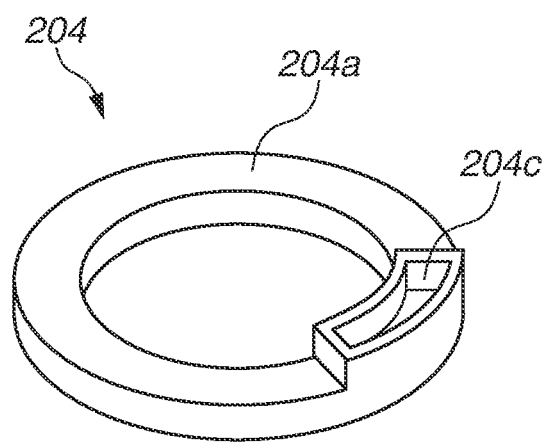
FIG. 16 is a detailed view of an example of an elastic member according to an exemplary embodiment.
Figure 17:
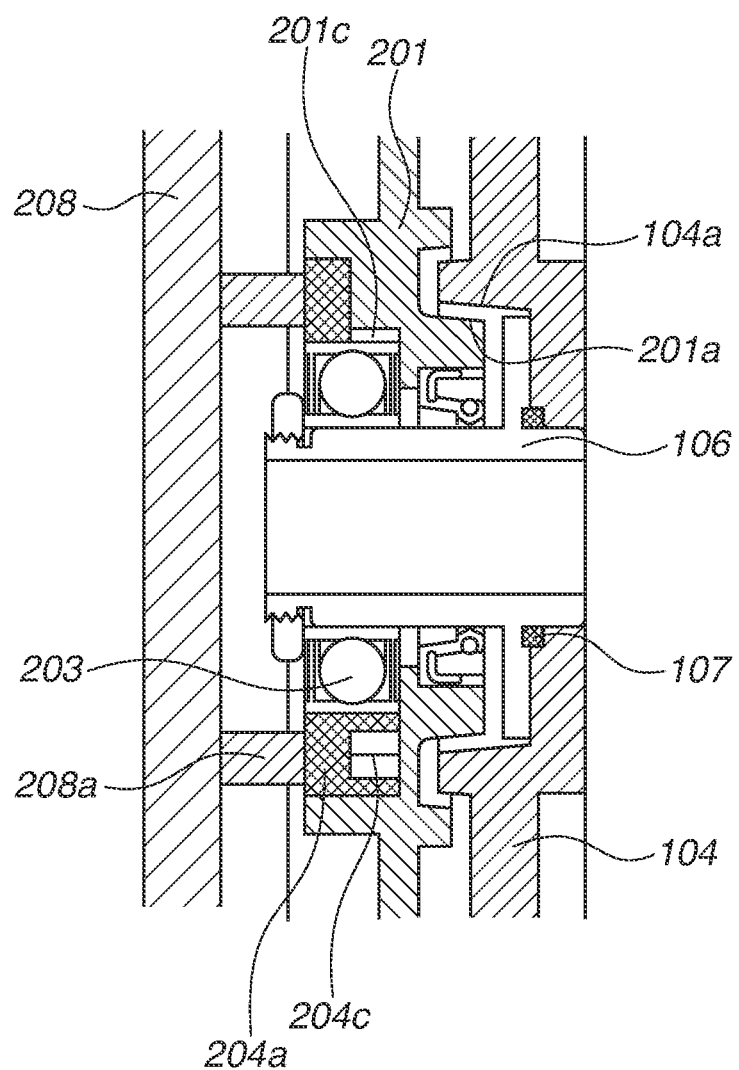
FIG. 17 is a cross-sectional view of a portion around a tilt shaft according to an exemplary embodiment.

A third exemplary embodiment will be described below. In the mechanism described in the second exemplary embodiment, the circular rubber ring 204a and the flat spring 204b are used as the elastic member 204, and the impact is received from the direction perpendicular to the tilt shaft 106. On the other hand, the impact in the tilt shaft 106 direction, can be alleviated by, for example, causing a protrusion shape 208a provided in the side cover 208 to abut on the circular rubber ring 204a. This embodiment will be described below. FIG. 16 illustrates an example of an elastic member 204 according to the present exemplary embodiment. FIG. 17 illustrates a cross-sectional view of a portion around a tilt shaft 106 in a case where the elastic member 204 is used. In the present exemplary embodiment, the elastic member 204 is configured of a circular rubber ring 204a and a hollow rubber ring 204c. The circular rubber ring 204a and the hollow rubber ring 204c are integrally formed. The elastic member 204 is engaged with and supported by the tilt shaft 106 together with a ball bearing 203, in such a manner that the hollow rubber ring 204c is disposed on the fixing unit 300 side relative to the tilt shaft 106. The side cover 208 includes the protrusion shape 208a contacting the circular rubber ring 204a from the tilt shaft 106 direction.

In a case where no impact is applied, the ball bearing 203 is pressed and urged against an abutting surface 201c by an elastic force of the hollow rubber ring 204c. It is desirable that the urging force at this moment is not less than a load combining a force for supporting at least the weight of a camera unit 100 and the tilt shaft 106, and a detaching force from the abutting surface 201c due to a moment generated during tilt operation. Because the abutting surface 201c is configured of two planes substantially parallel to the tilt shaft 106, the ball bearing 203 is urged to come into contact with the two planes. The ball bearing 203 is thereby supported at the home position.

[Mechanism for Alleviating Impact from Above or from Front/Back Direction]

When an impact of a certain level or more is applied from above or from a front/back direction, a buckling distortion occurs in the hollow rubber ring 204c, so that the elastic force decreases. The tilt shaft 106 and the ball bearing 203 are moved, but at this moment, the circular rubber ring 204a is compressed and deformed to alleviate the impact. Regardless of the direction of the impact, buffering and positioning effects similar to those in a case where the flat spring 204b and the circular rubber ring 204a are used as an elastic member, are achieved.

[Mechanism for Alleviating Impact from Tilt-Shaft Direction]

Next, a case where an impact from the tilt shaft 106 direction is applied will be described. When the impact is applied to a pan outer cover 220 from the tilt shaft 106 direction, the pan outer cover 220 is pressed. Accordingly, the side cover 208 is pressed and deformed. At this moment, the protrusion shape 208a of the side cover 208 compresses and deforms the circular rubber ring 204a and the hollow rubber ring 204c. As a result, the impact is alleviated.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-153817, filed Aug. 9, 2017, which is hereby incorporated by reference herein in its entirety.

What is claimed is:

1. An imaging apparatus comprising:
a camera unit including an image sensor;
a support portion supporting the camera unit rotatably about a rotational shaft;
a bearing disposed around the rotational shaft;
a first elastic member disposed between an outer periphery of the bearing and the support portion, and configured to urge the support portion and the outer periphery of the bearing; and
a second elastic member disposed between the camera unit and the first elastic member, in a rotational shaft direction, and configured to urge the bearing to the support portion,
wherein the camera unit is movable in a direction substantially orthogonal to the rotational shaft due to deformation of the first elastic member in a case where an impactive force is applied to the camera unit.

2. The imaging apparatus according to claim 1, wherein the camera unit has one of a circular protrusion and a circular depression, and the support portion has remaining one of the circular protrusion and the circular depression, the circular protrusion and the circular depression being coaxially arranged relative to the rotational shaft and arranged with a space therebetween.

3. The imaging apparatus according to claim 1, further comprising a fixing portion supporting the support portion, and the second elastic member disposed between the fixing portion and the rotational shaft in a direction orthogonal to the rotational shaft direction.

4. The imaging apparatus according to claim 1, wherein the bearing is disposed between the support portion and the rotational shaft in a diameter direction of the rotational shaft.

5. The imaging apparatus according to claim 1, wherein the first elastic member is made of rubber and the second elastic member is a flat spring.

6. The imaging apparatus according to claim 1, wherein each of the first elastic member and the second elastic member is made of rubber.

7. The imaging apparatus according to claim 1, wherein the support portion has an abutting surface configured of two planes forming an angle of 90 degrees or more, and the bearing is urged against the abutting surface by the second elastic member.

8. An imaging apparatus comprising:
a camera unit including an image sensor;
a support portion supporting the camera unit rotatably about a rotational shaft;
a bearing disposed around the rotational shaft; and
an elastic member disposed between an outer periphery of the bearing and the support portion, and configured to urge the support portion and the outer periphery of the bearing,
wherein the camera unit has one of a circular protrusion and a circular depression, and the support portion has remaining one of the circular protrusion and the circular depression, the circular protrusion and the circular depression being coaxially arranged relative to the rotational shaft and arranged with a space therebetween, wherein the camera unit is movable in a direction substantially orthogonal to the rotational shaft due to deformation of the elastic member in a case where an impactive force is applied to the camera unit.

* * * * *